US012326675B2

(12) United States Patent
Sato

(10) Patent No.: US 12,326,675 B2
(45) Date of Patent: *Jun. 10, 2025

(54) IMAGE FORMING APPARATUS WITH REMOVABLE WASTE TONER CONTAINER AND EXPOSABLE FEEDING PATH

(71) Applicant: Brother Kogyo Kabushiki Kaisha, Nagoya (JP)

(72) Inventor: Shougo Sato, Seto (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/741,048

(22) Filed: Jun. 12, 2024

(65) Prior Publication Data

US 2024/0329568 A1 Oct. 3, 2024

Related U.S. Application Data

(63) Continuation of application No. 18/311,954, filed on May 4, 2023, now Pat. No. 12,124,192, which is a
(Continued)

(30) Foreign Application Priority Data

May 27, 2010 (JP) ................................ 2010-121927

(51) Int. Cl.
*G03G 15/16* (2006.01)
*G03G 15/00* (2006.01)
(Continued)

(52) U.S. Cl.
CPC ....... *G03G 15/1605* (2013.01); *G03G 15/168* (2013.01); *G03G 15/6558* (2013.01);
(Continued)

(58) Field of Classification Search
CPC .. G03G 15/168; G03G 15/6558; G03G 21/12; G03G 21/1619; G03G 21/1638;
(Continued)

(56) References Cited

U.S. PATENT DOCUMENTS 7,909,318 B2 3/2011 Kim et al.
8,385,771 B2 2/2013 Mori et al.
(Continued)

FOREIGN PATENT DOCUMENTS

JP 10-039566 A 2/1998
JP 2004-279919 A 10/2004
JP 2007-140144 A 6/2007

OTHER PUBLICATIONS

Notice of Allowance issued in U.S. Appl. No. 13/073,138 mailed Feb. 5, 2014.
(Continued)

*Primary Examiner* — Stephanie E Bloss
*Assistant Examiner* — Michael A Harrison
(74) *Attorney, Agent, or Firm* — Banner & Witcoff, Ltd.

(57) ABSTRACT

An image forming apparatus includes a chassis having an opening, a cover, photosensitive members, an intermediate transfer belt, a primary-transfer member, a secondary-transfer roller, a cleaner device, an external-sheet inlet, a waste toner container, a connector, and a conveying roller, which is arranged within the feeding path to feed the recording sheet inserted through the external-sheet inlet in the feeding path. The conveying roller is mounted on the waste toner container and removable from the chassis along with the waste toner container.

8 Claims, 9 Drawing Sheets

Related U.S. Application Data continuation of application No. 17/222,679, filed on Apr. 5, 2021, now Pat. No. 11,681,244, which is a continuation of application No. 16/832,238, filed on Mar. 27, 2020, now Pat. No. 11,009,811, which is a continuation of application No. 16/696,079, filed on Nov. 26, 2019, now Pat. No. 10,642,194, which is a continuation of application No. 16/356,018, filed on Mar. 18, 2019, now Pat. No. 10,520,858, which is a continuation of application No. 16/157,668, filed on Oct. 11, 2018, now Pat. No. 10,274,872, which is a continuation of application No. 15/599,563, filed on May 19, 2017, now Pat. No. 10,126,685, which is a continuation of application No. 15/018,910, filed on Feb. 9, 2016, now Pat. No. 9,690,234, which is a continuation of application No. 14/289,753, filed on May 29, 2014, now Pat. No. 9,291,956, which is a continuation of application No. 13/073,138, filed on Mar. 28, 2011, now Pat. No. 8,805,266.

(51) Int. Cl.

*G03G 21/10* (2006.01)
*G03G 21/12* (2006.01)
*G03G 21/16* (2006.01)

(52) U.S. Cl.

CPC .......... *G03G 21/105* (2013.01); *G03G 21/12* (2013.01); *G03G 21/1619* (2013.01); *G03G 21/1638* (2013.01); *G03G 21/168* (2013.01); *G03G 2215/00405* (2013.01); *G03G 2215/0054* (2013.01); *G03G 2221/1624* (2013.01); *G03G 2221/1684* (2013.01)

(58) Field of Classification Search

CPC ....... G03G 21/168; G03G 2215/00405; G03G 2215/0054; G03G 2221/1684; G03G 2221/1624

See application file for complete search history.

(56) References Cited

U.S. PATENT DOCUMENTS

| | | | | |
|---|---|---|---|---|
| 8,509,648 | B2 | 8/2013 | Mori et al. | |
| 8,588,642 | B2 | 11/2013 | Mori et al. | |
| 9,944,478 | B2 | 4/2018 | Kasaishi et al. | |
| 12,124,192 | B2 * | 10/2024 | Sato | G03G 15/6558 |
| 2005/0169649 | A1 | 8/2005 | Onodera et al. | |
| 2006/0222401 | A1 | 10/2006 | Kamimura | |
| 2007/0009284 | A1 | 1/2007 | Okamoto et al. | |
| 2007/0196147 | A1 | 8/2007 | Nada et al. | |
| 2007/0231032 | A1 | 10/2007 | Matsuno | |
| 2009/0092429 | A1 | 4/2009 | Yokota | |
| 2009/0324279 | A1 | 12/2009 | Miyahara et al. | |
| 2009/0324284 | A1 * | 12/2009 | Ohta | G03G 21/105 399/120 |
| 2011/0236055 | A1 | 9/2011 | Mori et al. | |
| 2012/0207510 | A1 | 8/2012 | Sato | |
| 2013/0161893 | A1 | 6/2013 | Ro et al. | |
| 2013/0228967 | A1 | 9/2013 | Maeda et al. | |
| 2016/0347564 | A1 | 12/2016 | Kasaishi et al. | |

OTHER PUBLICATIONS

May 8, 2015—(US) Non-Final Office Action—U.S. Appl. No. 14/289,753.
Sep. 14, 2015—(US)—Final Office Action—U.S. Appl. No. 14/289,753.
Dec. 3, 2015—(US) Notice of Allowance—U.S. Appl. No. 14/289,753.
Apr. 5, 2017—(US) Notice of Allowance—U.S. Appl. No. 15/018,910.
Sep. 12, 2018—(US) Notice of Allowance—U.S. Appl. No. 15/599,563.
Feb. 12, 2019—(US) Notice of Allowance—U.S. Appl. No. 16/157,668.
Jun. 27, 2019—(US) Non-final Office Action—U.S. Appl. No. 16/356,018.
Sep. 11, 2019—(US) Notice of Allowance—U.S. Appl. No. 16/356,018.
Jan. 15, 2020—(US) Notice of Allowance—U.S. Appl. No. 16/696,079.
Apr. 30, 2020—(US) Non-final Office Action—U.S. Appl. No. 16/832,238.
Oct. 19, 2020—(US) Notice of Allowance—U.S. Appl. No. 16/832,238.
Jan. 11, 2021—(US) Notice of Allowance—U.S. Appl. No. 16/832,238.
Nov. 22, 2022—(US) Non-Final Office Action—U.S. Appl. No. 17/222,679.
Mar. 1, 2024—(US)—Non-final Office Action—U.S. Appl. No. 18/311,954.

* cited by examiner

IMAGE FORMING APPARATUS WITH REMOVABLE WASTE TONER CONTAINER AND EXPOSABLE FEEDING PATH

REFERENCE TO RELATED APPLICATIONS

This application is a continuation of U.S. application Ser. No. 18/311,954, filed on May 4, 2023, which is a continuation of U.S. application Ser. No. 17/222,679, filed on Apr. 5, 2021, now U.S. Pat. No. 11,681,244 B2, which is a continuation of U.S. application Ser. No. 16/832,238, filed on Mar. 27, 2020, now U.S. Pat. No. 11,009,811 B2, which is a continuation of U.S. application Ser. No. 16/696,079, filed Nov. 26, 2019, now U.S. Pat. No. 10,642,194 B2, which is a continuation of U.S. application Ser. No. 16/356,018, filed Mar. 18, 2019, now U.S. Pat. No. 10,520,858 B2, which is a continuation of U.S. application Ser. No. 16/157,668, filed Oct. 11, 2018, now U.S. Pat. No. 10,274,872 B2, which is a continuation of U.S. application Ser. No. 15/599,563, filed May 19, 2017, now U.S. Pat. No. 10,126,685 B2, which is a continuation of U.S. application Ser. No. 15/018,910, filed Feb. 9, 2016, now U.S. Pat. No. 9,690,234 B2, which is a continuation of U.S. application Ser. No. 14/289,753, filed May 29, 2014, now U.S. Pat. No. 9,291,956 B2, which is a continuation of U.S. application Ser. No. 13/073,138, filed Mar. 28, 2011, now U.S. Pat. No. 8,805,266 B2, which claims priority from Japanese Patent Application No. 2010-121927, filed on May 27, 2010, the entire disclosures of which are incorporated herein by reference.

BACKGROUND ART

Technical Field

An aspect of the present invention relates to an image forming apparatus, specifically having an intermediate transfer belt, to which a toner image is transferred from one or more photosensitive members, and a waste toner container, which stores residues such as residual toner removed from the intermediate transfer belt.

Background

An image forming apparatus having a waste toner container, in which residual toner collected from an intermediate transfer belt is stored, is known. The waste toner container may be arranged below the intermediate transfer belt and removed therefrom through an opening, which is formed on a side surface of a chassis of the image forming apparatus. The image forming apparatus may have a secondary-transfer roller, which serves in cooperation with the intermediate transfer belt to transfer a toner image formed on a surface of the belt to a sheet of paper, and a feed roller, which feeds the sheet from a sheet tray in a feeding path to a nipped position between the intermediate transfer belt and the secondary-transfer roller. The secondary-transfer roller and the feed roller may be arranged in positions on a side opposite from the opening for the waste toner container. Therefore, in such configuration, the feeding path extending from an outlet of the sheet tray to the secondary-transfer roller may be formed on the side opposite from the chassis opening.

DESCRIPTION

SUMMARY

Meanwhile, an image forming apparatus may be configured to have an external sheet tray for manual sheet supply in addition to or in place of an internal sheet tray. The externally-supplied sheet may be inserted in the image forming apparatus through an external-sheet inlet. With the external-sheet inlet, it is preferable that an opening for the inlet is formed on the same side as the opening for installation and removal of the waste toner container for convenience of handling the sheets and placement of the image forming apparatus. Further, in such a configuration, a feeding path for the externally-supplied sheets and pairs of feed rollers to convey the externally-supplied sheets in the feeding path are required in the image forming apparatus. However, with the feeding path extending from the opening side of the chassis to the opposite side, when the externally-supplied sheet is jammed in the lengthy feeding path, smooth removal of the jammed sheet may be difficult.

In view of the difficulty, the present invention is advantageous in that an image forming apparatus having a feeding path for externally-supplied sheet, in which the jammed sheet can be removed smoothly from the feeding path.

According to an aspect of the present invention, an image forming apparatus to form an image on a recording sheet is provided. The image forming apparatus includes a chassis having a first opening, which is formed on a first side of the chassis, a cover, which is movable between an open position and a closed position to expose and close the first opening, a plurality of photosensitive members, which are set in the chassis and carry toner images, an intermediate transfer belt, which is an endless rolling belt arranged to have a surface thereof facing the plurality of photosensitive members and to have the toner images on the plurality of photosensitive members transferred onto the surface in cooperation with a plurality of primary-transfer members, a secondary-transfer roller, which is arranged on a second side opposite from the first side within the chassis and transfers the toner images on the surface of the intermediate transfer belt onto the recording sheet, a first feed roller, which is arranged in vicinity of the second side and conveys the recording sheet in a feeding path toward the secondary-transfer roller, a cleaner device, which is arranged in a position between one of the plurality of photosensitive members being in a most upstream position along a rolling direction of the intermediate transfer belt and the secondary-transfer roller, to collect residual toner from the surface of the intermediate transfer belt, a waste toner container, which is movable along a predetermined direction to be removably installed in the chassis through the first opening and settled in a position opposite from the plurality of photosensitive members across the intermediate transfer belt, to store the residual toner collected by the cleaner device, a connector, which is connected to the cleaner device, and to which the waste toner container is detachably attached, to convey the residual toner collected by the cleaner device to the waste toner container, a first feeding path, which extends in a range between the first feed roller and the secondary-transfer roller, an external-sheet inlet, which is formed on the first side of the chassis and through which a recording sheet is externally supplied to the image forming apparatus, a second feeding path, which is a path for the recording sheet being inserted through the external-sheet inlet and merges into the first feeding path in vicinity of the first feed roller, and an in-second-feeding-path conveying roller, which is arranged in the second feeding path to convey the recording sheet in the second feeding path. The in-second-feeding-path conveying roller is mounted on the waste toner container and removable from the chassis along with the waste toner container.

According to another aspect of the present invention, an image forming apparatus to form an image in toner on a recording sheet being conveyed in a feeding path is provided. The image forming apparatus includes a chassis having an opening formed on one side thereof, an external-sheet inlet, which is formed on the first side of the chassis and through which the recording sheet is externally supplied to the image forming apparatus, a waste toner container, which is movable along a predetermined direction to be removably installed in the chassis through the opening and stores residual toner, a feeding path, which is a path for the recording sheet being inserted through the external-sheet inlet, and a conveying roller, which is arranged within the feeding path to convey the recording sheet in the second feeding path. The conveying roller is mounted on the waste toner container and removable from the chassis along with the waste toner container.

Hereinafter, an embodiment according to an aspect of the present invention will be described with reference to the accompanying drawings.

Overall Configuration of the MFP

The MFP 1 is a multicolor-enabled MFP, equipped with a plurality of image processing functions including a scanning function, a printing function, a copier function, a facsimile transmission/receiving function, and a function for reading/writing data in a memory medium.

Figure 1:
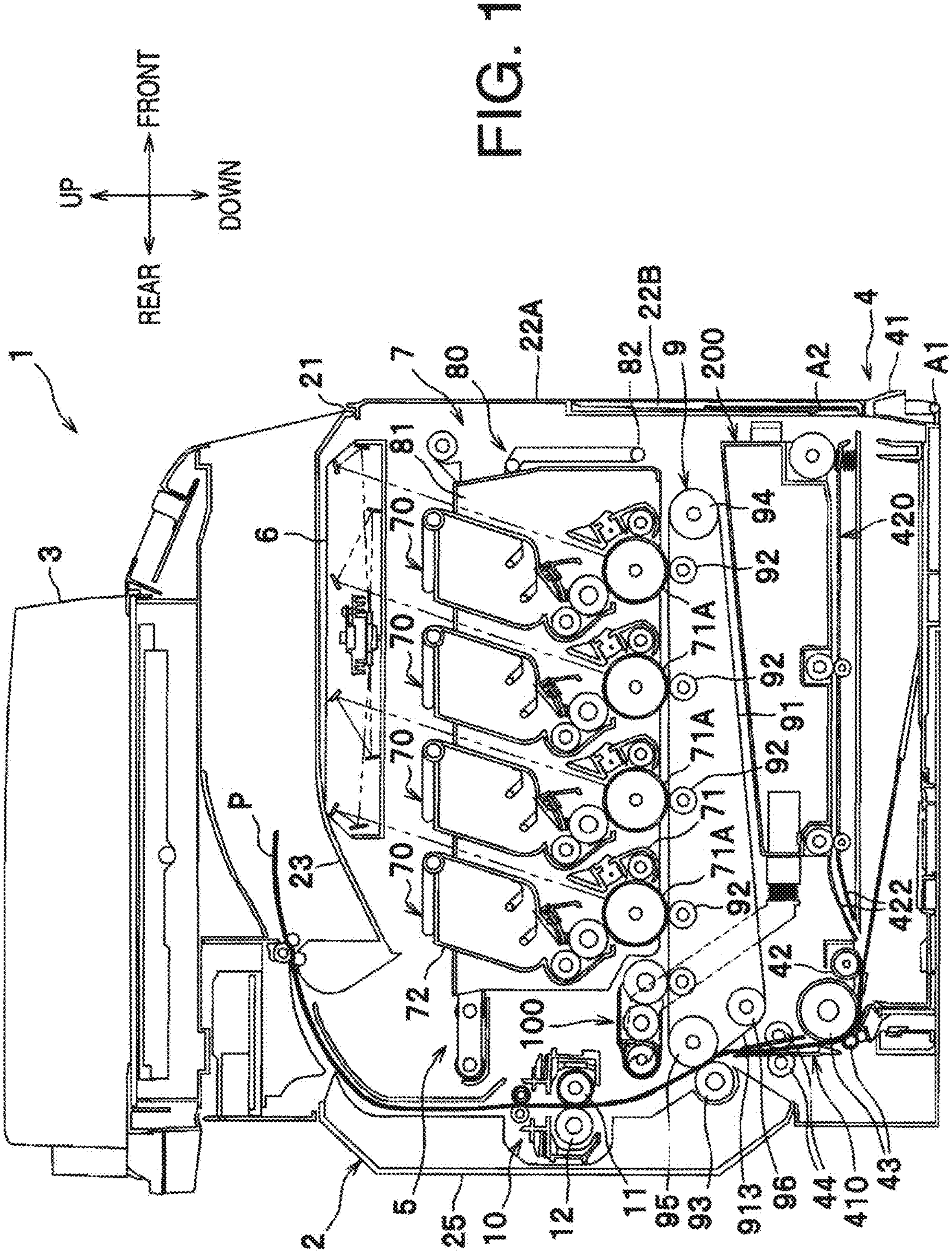
FIG. 1 is a cross-sectional side view of a multicolor MFP (multi-function peripheral) according to an embodiment of the present invention.
Figure 2:
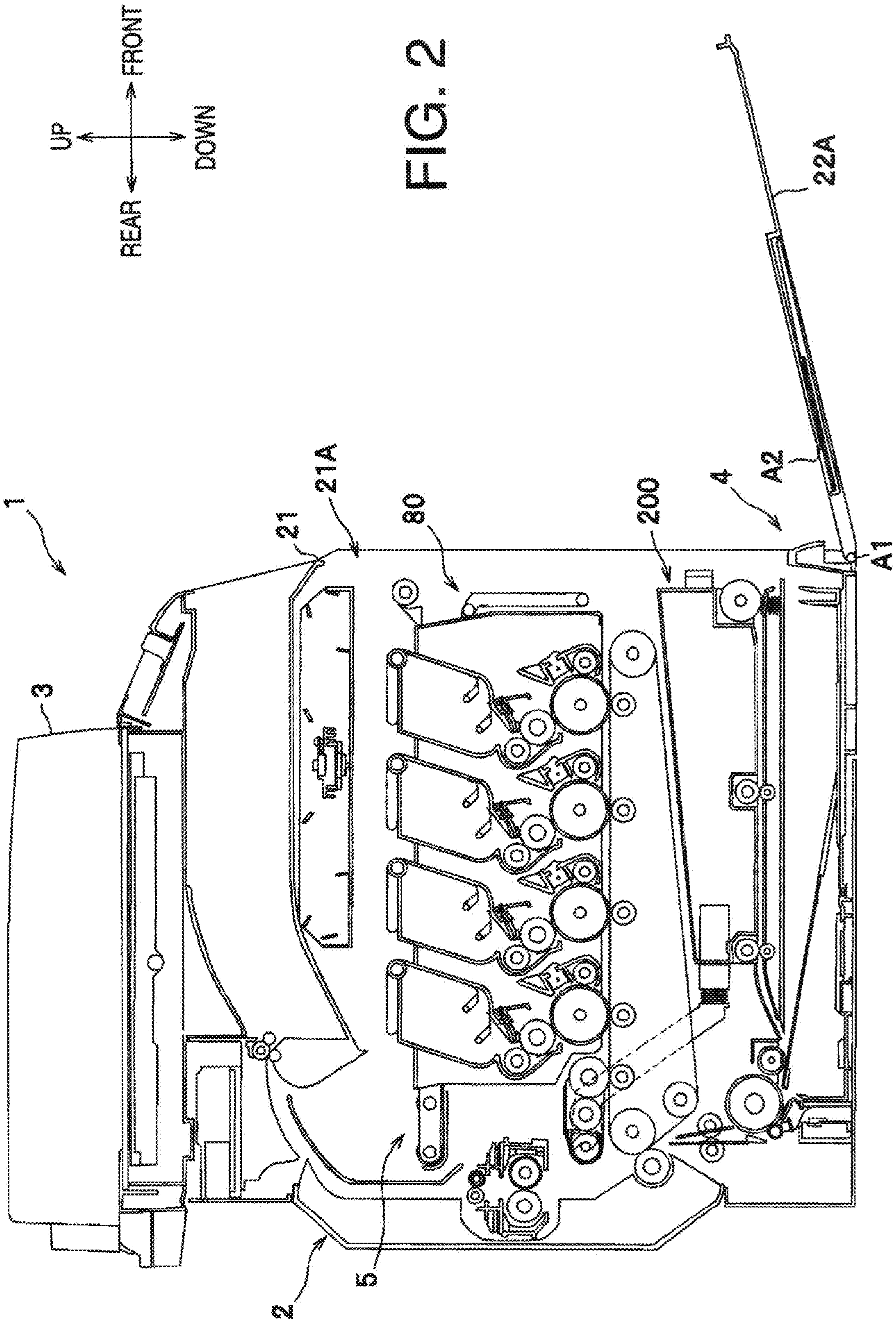
FIG. 2 is a cross-sectional side view of the MFP according to the embodiment of the present invention with a front cover being open.
Figure 3:
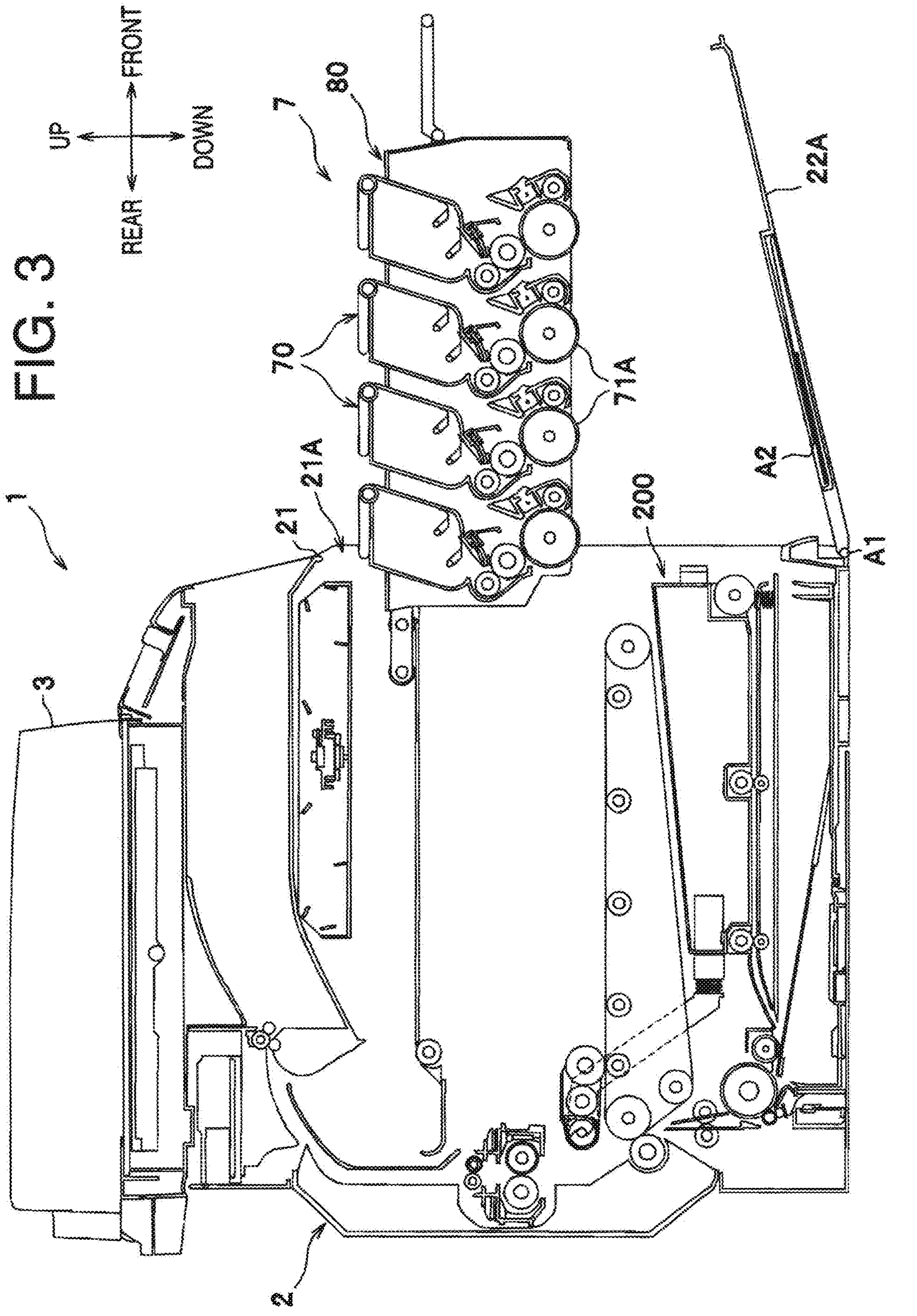
FIG. 3 is a cross-sectional side view of the MFP with a drawer drawn out of a chassis of the MFP according to the embodiment of the present invention.

In the present embodiment, directions concerning the MFP 1 will be referred to in accordance with orientation as indicated by arrows in each drawing. Therefore, for example, a viewer's right-hand side appearing in FIG. 1 is referred to as a front side of the MFP 1, and left-hand side in FIG. 1 opposite from the front side is referred to as rear. A side which corresponds to the viewer's nearer side is referred to as left, and an opposite side from the left, which corresponds to the viewer's further side is referred to as right. The up-down direction in FIG. 1 corresponds to a vertical direction of the MFP. Further, directions of the drawings in FIGS. 2-8 are similarly based on the orientation of the MFP 1 as defined above and correspond to those with respect to the MFP 1 shown in FIG. 1 even when the drawings are viewed from different angles. In cross-sectional views in the accompanying drawings, hatchings are omitted unless specifically required in order to simplify the illustration.

The MFP 1 according to the embodiment includes a chassis 2 and a flatbed scanner 3, which is arranged on top of the chassis 2. The MFP 1 further has a sheet-feed unit 4, which feeds recording sheets P of paper in a sheet feeding path, and an image forming unit 5, which forms images on the sheets P being fed, inside the chassis 2.

The chassis 2 is formed to have an opening 21A (see FIGS. 2-4) on a front side 21 thereof. The opening 21A is an opening, through which a drawer 80 to hold processing cartridges 70 and a waste toner container 200 are installed in and removed from the chassis 2. The opening 21A is covered by a front cover 22A, which is rotatable about a lower edge A1 thereof between an open position (see FIG. 1) and a closed position (see FIGS. 2-4) to cover and expose the opening 21A.

The front cover 22A is arranged in an upper position with respect to an internal sheet-feed tray 41. Further, the front cover 22A is formed to have a bottom-open rectangular-shaped smaller opening A2, which is open-ended at the lower edge A1. The opening A2 is an opening, through which the internal sheet-feed tray 41 can be installed in and removed from the chassis 2, and height and width thereof are greater than those of the internal sheet-feed tray 41.

The smaller opening A2 in the front cover 22A can be covered by an external sheet tray 22B. The external sheet tray 22B is a sheet tray, on which unused sheets P to be externally fed in the sheet feeding path are set. The external sheet tray 22B is rotatable about a rotation axis B2 with respect to the front cover 22A to cover and uncover an upper part of the smaller opening A2. The rotation axis B2 of the external sheet tray 22B extends in a slightly higher position with respect to a lower edge B1 of the external sheet tray 22B; therefore, when the external sheet tray 22B is opened (see FIG. 5), the lower edge B1 of the external sheet tray 22B is drawn inside the chassis 2. Further, when the external sheet tray 22B is in an open position, an upper surface of the external sheet tray 22B (i.e., an inner surface when closed), a right-side edge, a left-side edge, and an upper edge of the smaller opening A2 serve as an external-sheet inlet 421. The sheet P manually inserted through the external-sheet inlet 421 is conveyed in a second feeding path 420, which directs the sheet P to a feed roller 42. The second feeding path 420 and the feed roller 42 will be described later in detail.

The flatbed scanner 3 (see FIG. 1) arranged on top of the chassis 2 is a known document reader, which irradiates light onto a source document to read an image formed thereon and creates image data representing the read image.

The sheet-feed unit 4 is arranged in a lower section of the chassis 2. The sheet-feed unit 4 includes the internal sheet-feed tray 41, the feed roller 42, a first separator roller 43, and a pair of first conveyer rollers 44. The internal sheet-feed tray 41 is removably installed in the chassis 2, through the smaller opening A2 of the front cover 22A, in a lower position with respect to the second feeding path 420.

The internal sheet-feed tray 41 is a container to store unused sheets P. The feed roller 42 is arranged in an upper-rear position with respect to the internal sheet-feed tray 41 and picks up the sheets P from the internal sheet-feed tray 41. The sheets P having been picked up by the feed roller 42 are separated by the first separator roller 43 and conveyed upwardly by the first conveyer rollers 44 one-by-one to a position between an intermediate transfer belt 91 and a secondary transfer roller 93 in the image forming unit 5.

The image forming unit 5 includes an exposure unit 6, a photosensitive developer unit 7, a belt unit 9, and a fixing unit 10.

The exposure unit 6 is arranged in an upper section in the chassis 2 and includes a laser-beam source (unsigned), a polygon mirror, a lens, and a reflection mirror (not shown). Laser beams emitted from the laser-beam source for yellow, cyan, magenta, and black colors are reflected on the polygon mirrors and the reflection mirrors and transmit through the lenses to be casted to scan on surfaces of photosensitive drums 71A. Double-dotted lines shown in FIG. 1 represent paths of the laser beams.

The photosensitive developer unit 7 is arranged in a lower section with respect to the exposure unit 6 and a higher section with respect to the belt unit 9. The photosensitive developer unit 7 includes four (4) processing cartridges 70, which are aligned in line in a front-rear direction, and a drawer 80, which detachably holds the processing cartridges 70.

Each of the processing cartridges 70 has a drum cartridge 71 in a lower section and a developer cartridge 72, which is detachably attached to a top section of the drum cartridge 71.

The drum cartridge 71 includes a photosensitive drum 71A and a charger (unsigned). Whilst four (4) drum cartridges 71 are aligned in line in the front-rear direction, four (4) photosensitive drums 71A are also aligned in line in the front-rear direction.

Each of the developer cartridges 72 is equipped with a developer roller, a supplier roller, and a toner container (unsigned). Each toner container contains nonmagnetic mono-component toner in one of cyan, magenta, yellow, and black colors.

The drawer 80 includes a main frame 81, which holds the processing cartridges 70, and a rotatable handle 82, which is arranged on a front side of the main frame 81. The drawer 80 is slidable in the chassis 2 in the front-rear direction to be installed in and removed from the chassis 2 through the opening 21A (see FIG. 3). In particular, the drawer 80 is movable between an installed position, in which the entire drawer 80 is settled in the chassis 2 (see FIG. 1), and a removed position, in which the drawer 80 is removed out of the chassis 2 (see FIG. 3).

In the photosensitive developer unit 7 configured as above, the charger electrically charges a surface of the photosensitive drum 71A evenly, and the surface of the photosensitive drum 71A is exposed to the laser beam emitted based on image data from the exposure unit 6 in order to form a lower-potential regions, i.e., an electrostatic latent image, thereon.

Meanwhile, the toner in the developer cartridge 72 is supplied to the latent image on the photosensitive drum 71A via the supplier roller and the developer roller. Thus, the latent image is developed to be a toner image carried on the surface of the photosensitive drum 71A.

The belt unit 9 is arranged in a lower position with respect to the photosensitive developer unit 7 and includes an intermediate transfer belt 91, four (4) primary-transfer rollers 92, a secondary-transfer roller 93, a driving roller 94, and two (2) driven rollers 95, 96. In particular, the driven roller 96 is arranged in a rear section of the chassis 2 and in a vertically overlapping position with the driven roller 95. The MFP 1 has a cleaner device 100 and a waste toner container 200, which will be described later in detail, in positions in the vicinities of the belt unit 9.

The intermediate transfer belt 91 is an endless belt extended to roll around rollers 94, 95, 96, which are arranged in a shape of a flat-triangular wedge when viewed from a side, in a clockwise direction in FIGS. 1-5 and FIG. 6A. More specifically, the intermediate transfer belt 91 has a first plane 911, which extends between the driving roller 94 being a front end portion and the driven roller 95 being a rear end portion horizontally to face the photosensitive drums 71A and the cleaner device 100, a second plane 912, which extends from the front end portion (i.e., the driving roller 94) of the first plane 911 downwardly in an inclined angle (e.g., toward lower left) to the driven roller 96, and a third plane 913, which extends from the rear end portion (i.e., the driven roller 95) of the first plane 911 downwardly in an inclined angle (e.g., toward lower right) to meet a rear end portion (i.e., the driven roller 96) of the second plane 912 (see FIG. 6A). Specifically, the second plane 912 is in contact with the driven roller 96, which is in the rear section of the chassis 2, and extends from the rear section of the chassis 2 in an upward-inclined angle to a section in a vicinity of the front side 21 of the chassis 2.

The intermediate transfer belt 91, the feed roller 42, and other sheet-feeding components such as a sheet guide (unsigned) are arranged in predetermined positions to have the sheet P conveyed by the feed roller 42 to become in contact with the third plane 913 of the intermediate transfer belt 91 (see FIG. 1). The sheet P being in contact with the third plane 913 is conveyed by the rolling movement of the intermediate transfer belt 91 along the third plane 913 to a nipped position between the driven roller 95 and the secondary-transfer roller 93. When the sheet P is not carried along the third plane 913 but is carried in a path apart from the intermediate transfer belt 91 until the sheet P becomes in the vicinity of the secondary-transfer roller 93, electricity may be discharged between the third plane 913 of the intermediate transfer belt 91 and the sheet P. However, in the present embodiment, the discharge of electricity can be reduced due to the sheet P being in contact with the intermediate transfer belt 91 at the third plane 913.

The primary-transfer rollers 92 are arranged in positions to oppose the photosensitive drums 71A with the intermediate transfer belt 91 intervening therebetween and in contact with an upper internal surface of the intermediate transfer belt 91. The secondary-transfer roller 93 is arranged on a side opposite from the opening 21A within the chassis 2 in a position to oppose the secondary-transfer roller 93 via the rear end portion of the intermediate transfer belt 91. When the toner images are transferred to the surface of the intermediate transfer belt 91 and to the sheet P, transfer bias which enables the image transfer is applied to the primary-transfer rollers 92 and the secondary-transfer roller 93 respectively.

In particular, the toner images formed on the photosensitive drums 71A in four colored toners are primarily transferred onto an upper external surface in the first plane 911 of the intermediate transfer belt 91 in layers in cooperation with the rotating primary-transfer rollers 92 and the applied transfer bias. The toner images formed in colors on the intermediate transfer belt 91 are secondarily transferred onto the sheet P when the sheet P is conveyed through the section between the intermediate transfer belt 91 and the secondary-transfer roller 93 in cooperation with the rotating secondary roller 93 and the applied transfer bias.

The fixing unit 10 is arranged in an upper position with respect to the secondary-transfer roller 93 and includes a heat roller 11 and a pressure roller 12, which is in a position opposite from the heat roller 11, to press the heat roller 11.

The sheet P with the transferred toner images is carried to a nipped section between the heat roller 11 and the pressure roller 12 in the fixing unit 10 to have the toner images thermally fixed thereon. The sheet P with the fixed image is ejected out of the chassis 2 by discharge rollers (unsigned) and settled in a discharge tray 23.

Configuration and Surroundings of the Waste Toner Container

Configuration of the waste toner container 200 and surroundings thereof will be described in detail.

The cleaner device 100 (see FIG. 6A), which is connected to the waste toner container 200 by a connector 300 (described later) will be described. The cleaner device 100 is to remove residual toner remaining on the intermediate transfer belt 91 after the image transfer. The cleaner device 100 is arranged in a position between one of the photosensitive drums 711, which is in a most upstream position along a direction of rolling for the intermediate transfer belt 91, and the secondary-transfer roller 93. The cleaner device 100 includes a case 140 accommodating a cleaning roller 110, a collecting roller 120, and an auger 130.

The cleaning roller 110 rotates on the upper external surface of the intermediate transfer belt 91 to remove the residual toner from the surface. In particular, the cleaning roller 110 removes the residual toner in cooperation with a backup roller 111, which is arranged in an opposite position across the intermediate transfer belt 91, with predetermined bias applied to the cleaning roller 110 toward the backup roller 111.

The removed residual toner is passed to the collecting roller 120 as the collecting roller 120 and the cleaning roller 110 rotate. The collecting roller 120 is a roller arranged to have a circumference thereof to be in contact with a circumference of the cleaning roller 110. The collected residual toner is scraped off from the circumference of the collecting roller 120 by a blade (unsigned) and forwarded to an auger room 141, which accommodates the auger 130.

Figure 6A:
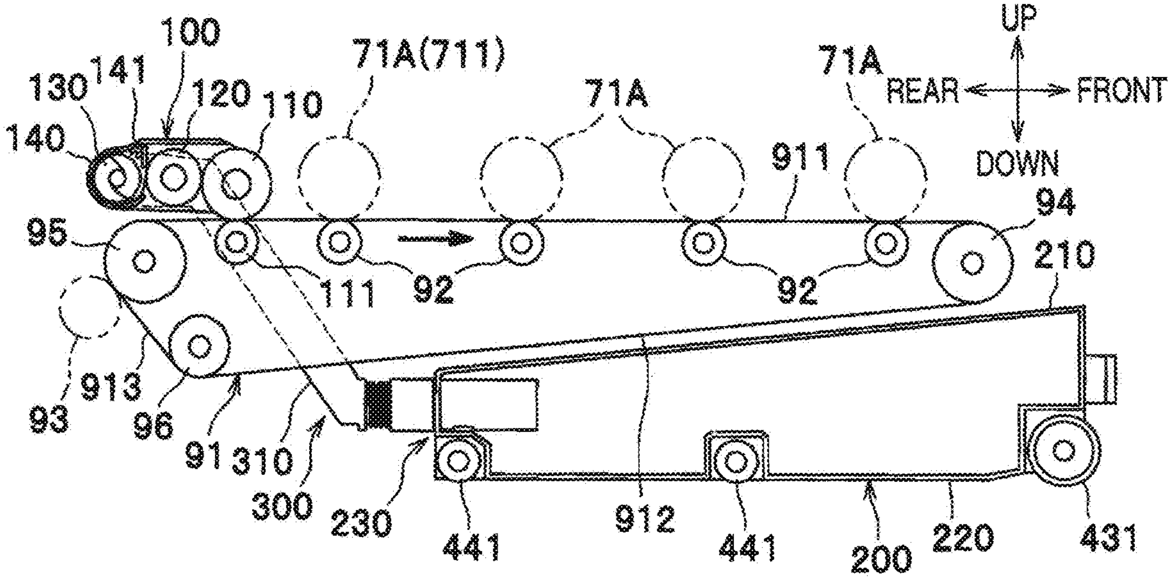
FIGS. 6A and 6B are an illustrative side view and a top plane view of an intermediate transfer belt, a cleaner device, a connector, and the waste toner container in the MFP according to the embodiment of the present invention.
Figure 6B:
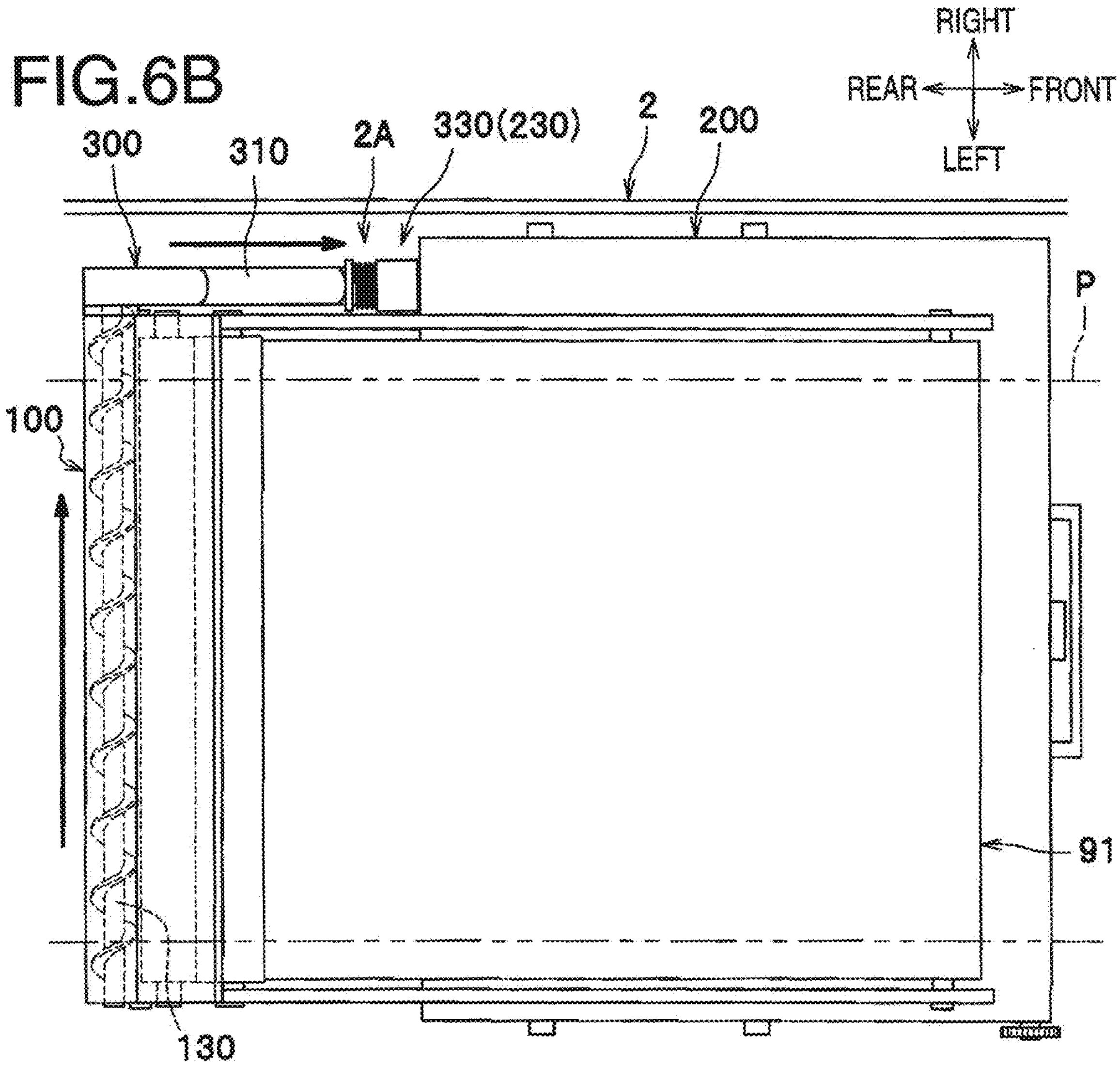
Figure 7A:
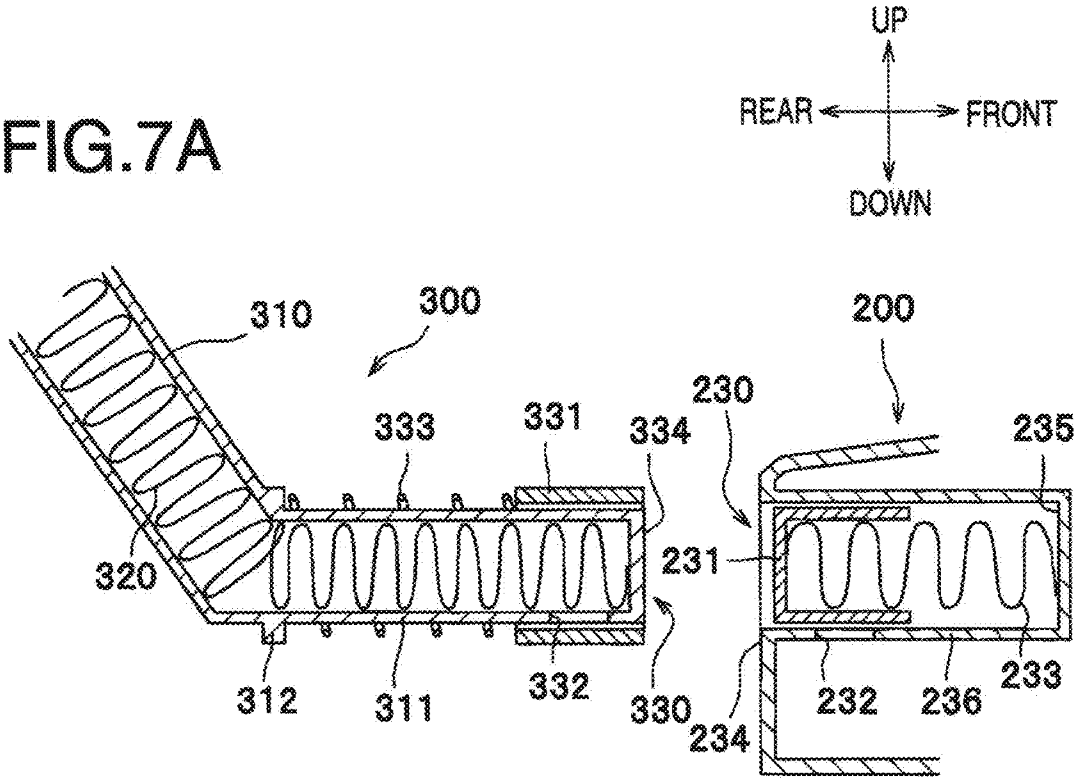
FIG. 7A is a cross-sectional side view of the connector detached from the waste toner container in the MFP according to the embodiment of the present invention.
Figure 7B:
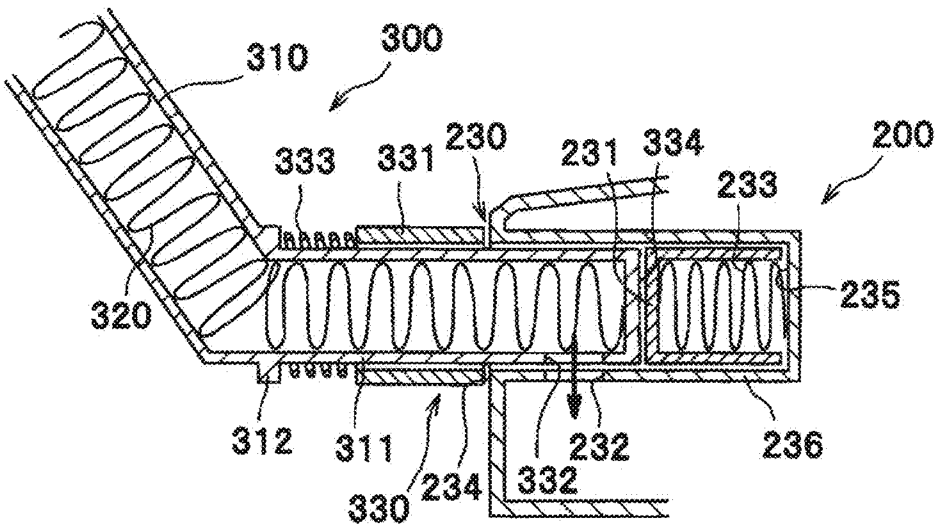
FIG. 7B is a cross-sectional side view of the connector attached to the waste toner container in the MFP according to the embodiment of the present invention.
Figure 8A:
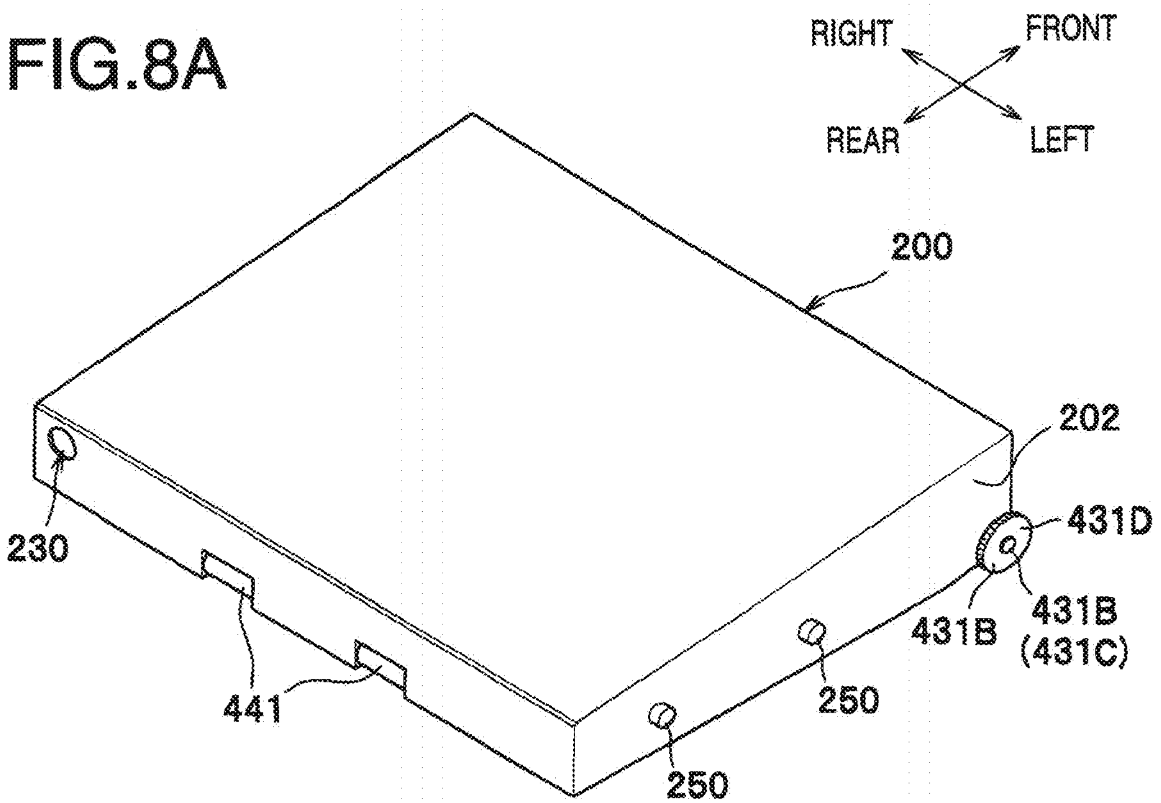
FIG. 8A is a perspective view of the waste toner container from top in the MFP according to the embodiment of the present invention.
Figure 8B:
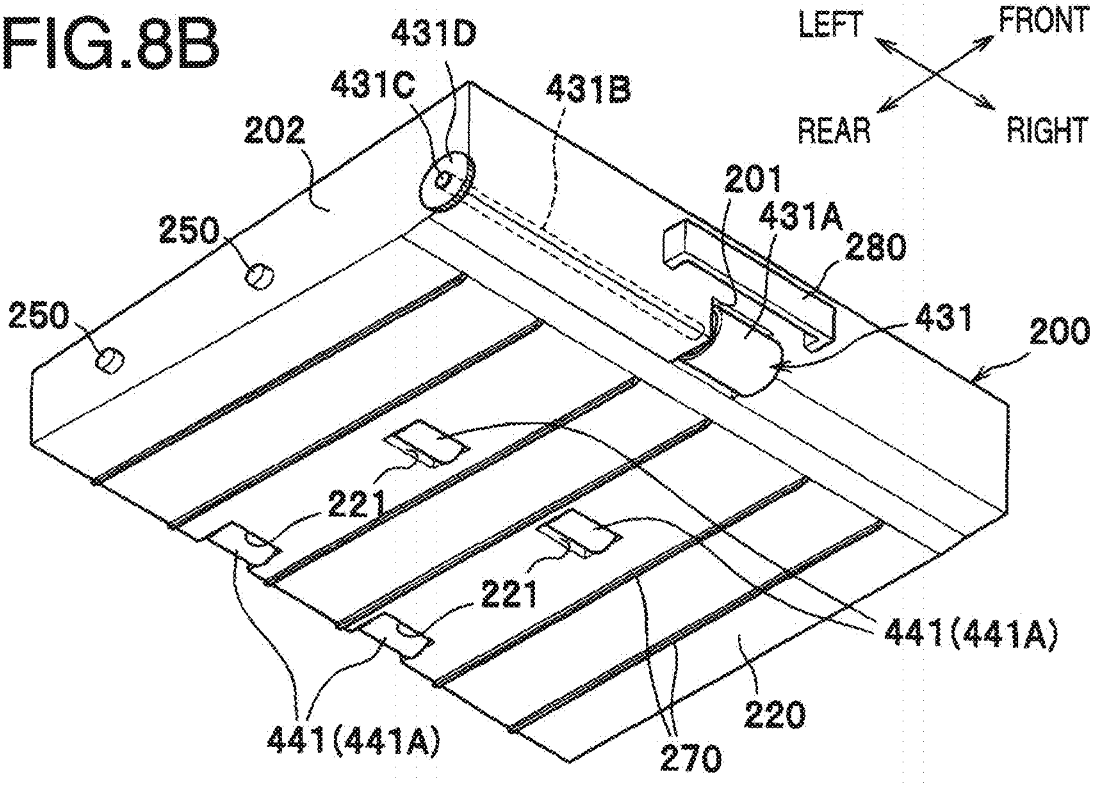
FIG. 8B is a perspective view of the waste toner container from bottom in the MFP according to the embodiment of the present invention.

The auger 130 is a roller having a spiral twining around a shaft (see FIG. 6B). As the auger 130 rotates about the shaft, the residual toner collected in the auger room 141 is carried outside one of widthwise (i.e., the right-left direction) ends of the intermediate transfer belt 91. In the present embodiment, the auger 130 carries the residual toner rightward. The toner carried rightward by the auger 130 is forwarded to the waste toner container 200 via a connector 300. The flow of the collected toner is indicated by thick arrows shown in FIG. 6B.

The connector 300 (see FIGS. 7A and 7B) connecting the cleaning device 100 with the waste toner container 200 will be described. The connector 300 is a pipe, which is connected to the cleaner device 100 at one end and to which the waste toner container 200 is detachably attached at the other end. The connector 300 includes a shell 310 being a pipe, which is arranged on a left side of the intermediate transfer belt 91 in clearance 2A between the widthwise end of the intermediate transfer belt 91 and the chassis 2. The connector 300 further includes a spring auger 320, which is arranged inside the shell 310 and rotatable within the shell 310 to convey the toner in an axial direction.

The connector 300 includes a connector joint 330 at a front end portion of the shell 310. The joint 330 is attachable to a receptacle joint 230 of the waste toner container 200 when the waste toner container 200 is installed in the chassis 2. Thus, the joints 230, 330 are mutually attachable and arranged in positions to align in the front-rear direction to face each other when the waste toner container 200 is inserted through the opening 21A and pushed inward to be completely installed.

The joints 230, 330 are provided with sealers 231, 331 respectively, which are slidable in the direction of installation and removal of the waste toner container 200 to cover and uncover openings 232, 332 formed in the waste toner container 200 and the shell 310. The sealers 231, 331 are pushed in the positions to cover the openings 232, 332 by resiliency of coil springs 233, 333. When the waste toner container 200 is attached to the connector 300, the sealers 231, 331 are pushed frontward and rearward respectively by a rear end edge 234 of the waste toner container 200 and a front end surface 334 of the connector 300 against the resiliency of the coil springs 233, 333.

More specifically, the sealer 331 of the connector 300 is a cylindrical sleeve and slidable in the front-rear direction with respect to a circumference 311 of the shell 310. Meanwhile, the sealer 231 of the waste toner container 200 is formed to have a cylinder with a closed rear end. The sealer 231 is arranged in a pit 235 formed in a rear-end section of the waste toner container 200 with an open end thereof facing front and slidable in the front-rear direction with respect to the waste toner container 200 within the pit 235. The opening 332 of the connector 300 is formed in a bottom part of the circumference 311 of the shell 310. The opening 232 of the waste toner container 200 is formed in a bottom part of a circumference 236 of the pit 235. The openings 232, 332 are formed in positions to coincide with each other when the waste toner container 200 is attached to the connector 300.

The coil spring 333 of the connector 300 is arranged in a position between the sealer 331 and an annular flange 312, which is formed to protrude outward from the outer circumference 311 of the shell 310. The coil spring 233 of the waste toner container 200 is arranged between a closed end of the sealer 231 and a closed end of the pit 235. The front end surface 334 of the shell 310 defines a front end surface of the shell 310 and accommodated within an inner diameter of the sealer 331. The rear end edge 234 of the pit 235 in the waste toner container 200 is formed to surround the sealer 231.

When the waste toner container 200 is attached to the connector 300, the sealer 331 is pushed rearward by the rear end edge 234 against the expandable force of the coil spring 333. At the same time, the sealer 231 is pushed frontward by the front end surface 334 of the shell 310 against the expandable force of the coil spring 233. Accordingly, the opening 332 of the connector 300 and the opening 232 of the waste toner container 200 coincide with each other to be connected (see FIG. 7B), and the collected toner is allowed to pass through the openings 332, 232 to be carried to the waste toner container 200.

The joints 230, 330 are arranged in a position outside width (length in the right-left direction) of the sheet P being carried in a second feeding path 420 (see FIG. 6B), which will be described later in detail.

Figure 5:
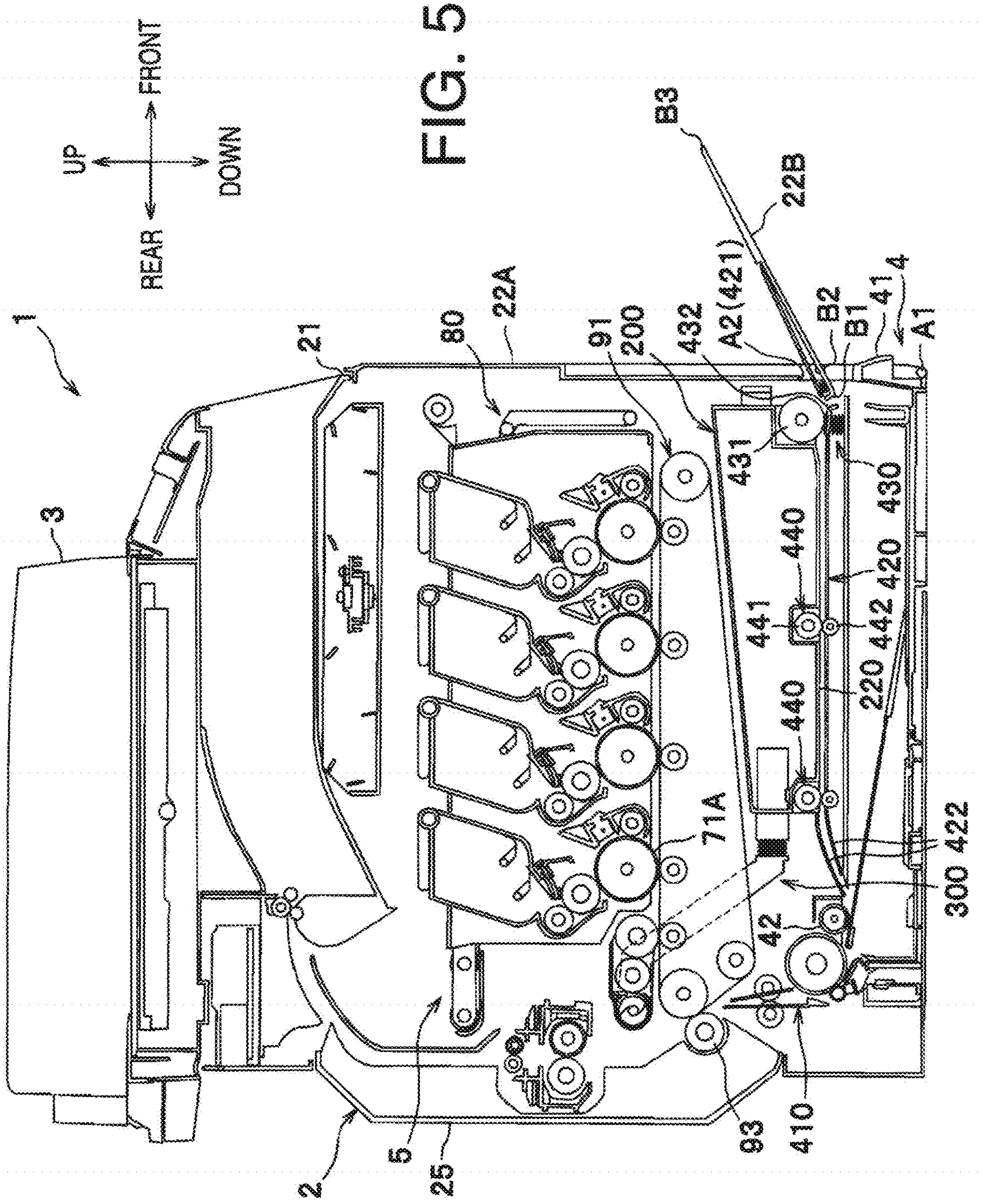
FIG. 5 is a cross-sectional side view of the MFP with an external sheet tray in an open position in the MFP according to the embodiment of the present invention.

The second feeding path 420 is formed in a vertical range between the waste toner container 200 and the internal sheet-feed tray 41 (see FIG. 5). The second feeding path 420 is a path for the externally-supplied sheet and extends from the front side 21 of the chassis 2 toward the rear side 25. The second feeding path 420 merges into a first feeding path 410, which ranges between the first feed roller 42 and the secondary-transfer roller 93.

More specifically, the second feeding path 420 is provided with the external-sheet inlet 421, a sheet guide 422, a separator 430, and second conveyer rollers 440. The sheet guide 422 includes an upper sheet guide and a lower sheet guide, which are arranged to have clearance therebetween for the externally-supplied sheet P to pass therethrough. The lower sheet guide 422 extends in a range between the external-sheet inlet 421 and the feed roller 42. The upper sheet guide 422 is formed to extend in a range between a position in vicinity of the feed roller 42 and a position in vicinity of a front end of the connector 300. Further, whilst the waste toner container 200 is arranged in a front position with respect to a front end of the upper sheet guide 422, and ribs 270 (see FIG. 8B) formed on the outer surface of a lower plane 220 of the waste toner container 200 serve as a part of the upper sheet guide 422.

The separator 430 is arranged in a front part of the second feeding path 420 and includes a second separator roller 431 and a separator pad 432. The second separator roller 431 is a roller to separate one of the sheets P inserted through the external-sheet inlet 421 from the others and convey the separated sheet P further in the second feeding path 420. The second separator roller 431 is rotatably attached to a lower-front corner section of the waste toner container 200, and when the waste toner container 200 is settled in the chassis 2, the second separator roller 431 comes in an upper position with respect to the separator pad 432. Thus, the second separator roller 431 is detachable from the chassis 2 along with the waste toner container 200. Meanwhile, the separator pad 432 is mounted on the chassis 2 via a spring (unsigned).

The second conveyer rollers 440 are a plurality of (e.g., four) pairs of rollers, which include an upper roller (an upper driven roller 441) and a lower roller (a lower driving roller 442), to convey the sheet P in between the upper and lower sheet guides 422 in the second feeding path 420 to the feed roller 42 and into the first feeding path 410. Two of the pairs are arranged in a midst position in the second feeding path 420, and another two of the pairs are arranged in a rear position in the second feeding path 420 (see FIGS. 5 and 8B).

The driven rollers 441 are mounted to the bottom 220 of the waste toner container 200 to be rotatably in contact with the paired driving rollers 442, which are rotatably mounted on the chassis 2, and rotated by rotation of the driving rollers 442. More specifically, two driven rollers 441 are arranged in lower-rear corner positions of the waste toner container 200 and two driven rollers 441 are arranged in center positions in the waste toner container 200. The driven rollers 441 in the lower-rear corner positions are arranged separately from each other along the widthwise direction, and the driven rollers 441 in the center positions are arranged separately from each other along the widthwise direction. Whilst the driven rollers 441 are attached to the waste toner container 200, the driven rollers 441 are detachable from the chassis 2 along with the waste toner container 200 and with the second separator roller 431.

Figure 4:
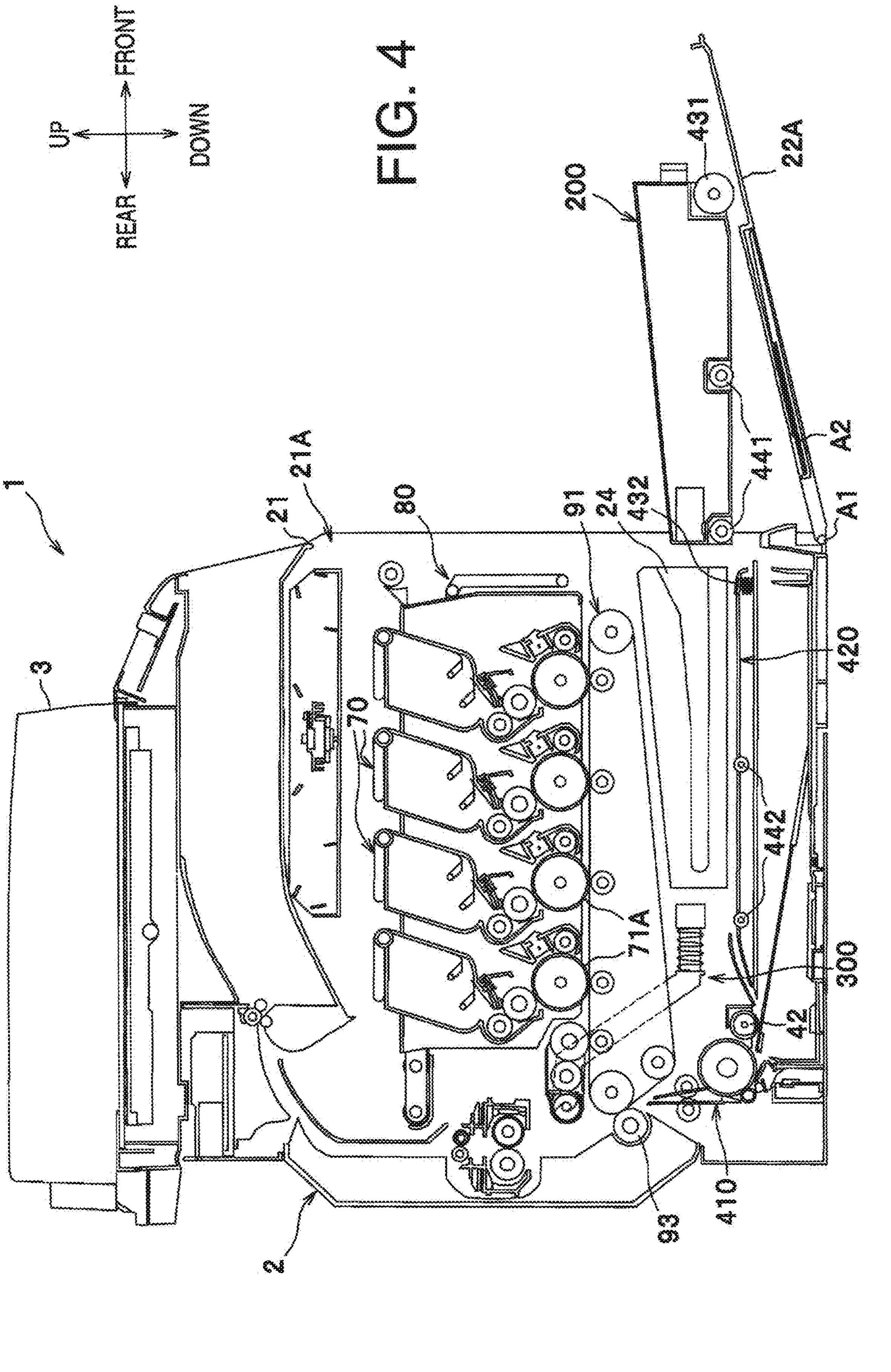
FIG. 4 is a cross-sectional side view of the MFP with a waste toner container removed out of the chassis of the MFP according to the embodiment of the present invention.

The waste toner container 200 accommodates waste toner and is detachably attached to the chassis 2 through the opening 21A and to the connector 300 (see FIG. 4). When attached, the waste toner container 200 is set in a lower position with respect to the intermediate transfer belt 91 on an opposite side from the photosensitive drums 71A. In other words, the waste toner container 200 and the photosensitive drums 71A are arranged in positions opposite from each other across the intermediate transfer belt 91 (see FIG. 1).

As shown in FIG. 6A, the waste toner container 200 is formed to have a trapezoidal wedge-like cross-section having an upper plane 210, which faces the second plane 912 of the intermediate transfer belt 91 and extends there-along, and a lower plane 220, which extends in parallel with the first plane 911 of the intermediate transfer belt 91. More specifically, the upper plane 210 is inclined upwardly toward front with a rear end thereof being lower than a front end thereof. A front side of the waste toner container 200 comes in the vicinity of the driving roller 94 inside the intermediate transfer belt 91 and extends in parallel with the front cover 22A (see FIG. 1) when the waste toner container 200 is settled in the cassis 2. The waste toner container 200 is formed to have the joint 230 on a rear side thereof (see FIGS. 8A and 8B). Further, the waste toner container 200 is provided with the second separator roller 431 and the driven rollers 441 in the lower section thereof.

More specifically, the waste toner container 200 is formed to have a dent 201 to accommodate the second separator roller 431 in the lower-front section and in a widthwise center range of the waste toner container 200. Meanwhile, the second separator roller 431 includes a rod 431A, which becomes in contact with the separator pad 432 when the waste toner container 200 is settled in the chassis 2, and a rotation shaft 431B, which extends along a rotation axis of the rod 431A and rotates integrally with the rod 431A.

With the rod 431A arranged in the dent 201, a lowermost circumference of the rod 431A slightly projects downwardly from the lower plane 220 of the waste toner container 200 to be lower than edges of the ribs 270. Further, the rotation shaft 431B is arranged to extend sideward (e.g., leftward) in the waste toner container 200 to protrude outwardly from a left side plane 202 of the waste toner container 200, and a gear 431D is fixed to the protruded left-side end of the rotation shaft 431B. The gear 431D is a part, in which external driving force to rotate the second separator roller 431 in input, and is engageable with an internal gear (not shown) mounted in the chassis 2. The internal gear can be driven by driving force from a motor (not shown) provided to the MFP 1, and when the waste toner container 200 with the second separator roller 431 is installed in the chassis 2 of the MFP 1, the gear 431D engages with the internal gear, and the driving force is transmitted to the rotation shaft 431B to rotate the rod 431A.

The four driven gear 411 are mounted to the bottom 220 of the waste toner container 200 in mutually separated positions along the front-rear direction and the widthwise direction of the waste toner container 200. More specifically, the waste toner container 200 is formed to have two recesses 221 in the lower-rear corner positions separately from each other along the widthwise direction and two recesses 221 in the central positions separately from each other along the widthwise direction. Each recess 221 accommodates a rod 441A of the driven roller 441.

With the driven rollers 441 arranged in the recesses 221, a lowermost circumference of each rod 441A slightly projects downwardly from the lower plane 220 of the waste toner container 200 to be lower than the edges of the ribs 270. A rotation shaft (not shown) of the driven roller 441, which axially penetrates the rod 441A, is rotatably supported by inner lateral surfaces of the recess 221.

The waste toner container 200 is formed to have a pair of guide pins 250 (see FIGS. 8A and 8B), which project outwardly, on each of a right side surface and a left side surface of the waste toner container 200. As the waste toner container 200 is installed in the chassis 2 through the opening 21A, the guide pins 250 are inserted in guide grooves 24 (see FIG. 4), which are formed on left side and right side inner surfaces of the chassis 2, and the waste toner container 200 is smoothly guided to a position, in which the waste toner container 200 is attached to the connector 300. The guide grooves 24 are formed to have height thereof to be smaller in an area closer to the rear of the chassis 2 and greater in an area closer to the front of the chassis 2 so that the guide pins 250 are more easily received in the guide grooves 24 in the area closer to the front.

Furthermore, the waste toner container 200 is formed to have the ribs 270 (see FIG. 8B), which protrude downwardly from the outer surface of the lower plane 220 and extend along the front-rear direction, when installed in the chassis 2. The ribs 270 are formed to face the second feeding path 420, when the waste toner container 200 is installed, and serve as a part of a sheet guide to guide the sheet being carried in the second feeding path 420. In other words, the ribs 270 form a part of the second feeding path 420.

The waste toner container 200 is further formed to have a handle 280 (see FIG. 8B), which can be grabbed to be handled by a user, on the front side thereof.

According to the MFP 1 with the above-described configuration, the second separator roller 431 and the driven rollers 441, which are to be arranged in the second feeding path 420, are rotatably attached to the waste toner container 200. Therefore, the second separator roller 431 and the driven rollers 441 are removable from the chassis 2 along with the waste toner container 200. When the second separator roller 431, the driven rollers 441, and the waste toner container 200 are removed from the chassis 2, an upper front part of the second feeding path 420 is exposed to be accessed by a user through the opening 21A, and the sheet jammed in the second feeding path can be easily removed.

According to the MFP 1 with the above-described configuration, the driven rollers 441 in the second conveyer rollers 440 are mounted on the waste toner container 200, which is removable from the chassis 2. If the driving rollers 442 are mounted on the removable waste toner container 200, arrangement to reverse transmission path of the driving force for the driving rollers 442 may become more complicated; however, due to the arrangement of the driven rollers 441 on the removable waste toner container 200, the configuration in the second feeding path 420 can be less complicated.

According to the configuration described above, with the second separator roller 431, which frictionally picks up one of the sheets P inserted through the external-sheet inlet 421 separately from the others and conveys the separated sheet P further in the second feeding path 420, unlike an MFP, in which a separator roller is omitted and a single sheet at a time may be fed manually, a plurality of sheets P can be set in the external-sheet inlet 421 in advance to be fed continuously in the image forming unit 5. In this regard, of course, it is to be noted that solely a single sheet P may be set on the external sheet tray 22B in the MFP 1 of the above embodiment. In other words, the second separator roller 431 may not necessarily separate but may pick up the single sheet through the external-sheet inlet 22 and convey the single sheet in the second feeding path 420.

According to the above configuration, the drawer 80 holding the processing cartridges 70 is removable through the opening 21A. Therefore, when exchange of the processing cartridges 70 is required, a user can access the processing cartridges 70 from the same side of the chassis 2 as the side, from which the user accesses the waste toner container 200 and the external-sheet inlet 421. Thus, the user's convenience for handling the MFP 1 is improved.

According to the above configuration, the waste toner collected by the cleaner device 100 is conveyed sideward by the auger 130 to the right. The waste toner is further carried to the waste toner container 200 by the connector 300, which is arranged in the clearance 2A formed on the right side of the intermediate transfer belt 91. Therefore, the waste toner can be efficiently carried in a shorter distance from the cleaner device 100 to the waste toner container 200. With the minimum configuration to carry the waste toner, the MFP 1 can be downsized.

According to the above configuration, the joints 230, 330 are arranged in the positions to oppose to each other in line in the installation/removal direction of the waste toner container 200. Accordingly, the structure of the connector 300 can be simplified compared to a connector with joints being arranged to oppose to each other in right-left direction, which is perpendicular to the installation/removal direction of the waste toner container 200.

According to the above configuration, the joints 230, 330 are arranged outside the width of the sheet P being carried in the second feeding path 420. Accordingly, even if the waste toner leaks through the joints 230, 330, the toner may not necessarily fall on the sheet being carried, and the sheet P is prevented from being ruined by the leaked toner.

According to the above configuration, when the joint 230 is detached from the joint 330, the sealers 231, 331 are automatically moved in the positions to cover the openings 232, 332. Thus, fall of the toner from the openings 232, 332 is prevented. Further, the connector 300 is efficiently handled by the automatic closing/opening structure of the sealers 231, 331. For example, compared to joints having sealers, which are manually moved by separately provided manipulation members, the structure of the connector 300 in the above embodiment is more simplified.

According to the above configuration, the sheet P being carried by the feed roller 42 becomes in contact with the third plane 913 of the intermediate transfer belt 91 before the sheet P enters the nipped position between the intermediate transfer belt 91 and the secondary-transfer roller 93. Therefore, the electrical discharge between the third plane 913 and the sheet P can be reduced.

According to the above configuration, with the intermediate transfer belt 91 having the wedge-shaped cross-section and the waste toner container 200 having the wedge-shaped cross-section, which are arranged in the vertically overlapping positions to substantially form a rectangular solid, the space inside the chassis 2 is efficiently used. Accordingly, the chassis 2 of the MFP 1 can be downsized in the height thereof.

According to the above configuration, the ribs 270 formed on the outer surface of the lower plane 220 of the waste toner container 200 serve as the sheet guide for the sheet P in the second feeding path 420. Therefore, when the waste toner container 200 is removed out of the chassis 2, the second feeding path 420 is exposed to be accessible through the opening 21A. Accordingly, when the sheet P is stuck in the second feeding path 420, the user can access the second feeding path 420 simply by removing the waste toner container 200 out of the chassis 2 to remove the jammed sheet.

Although an example of carrying out the invention has been described, those skilled in the art will appreciate that there are numerous variations and permutations of the image forming apparatus that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

Figure 9:
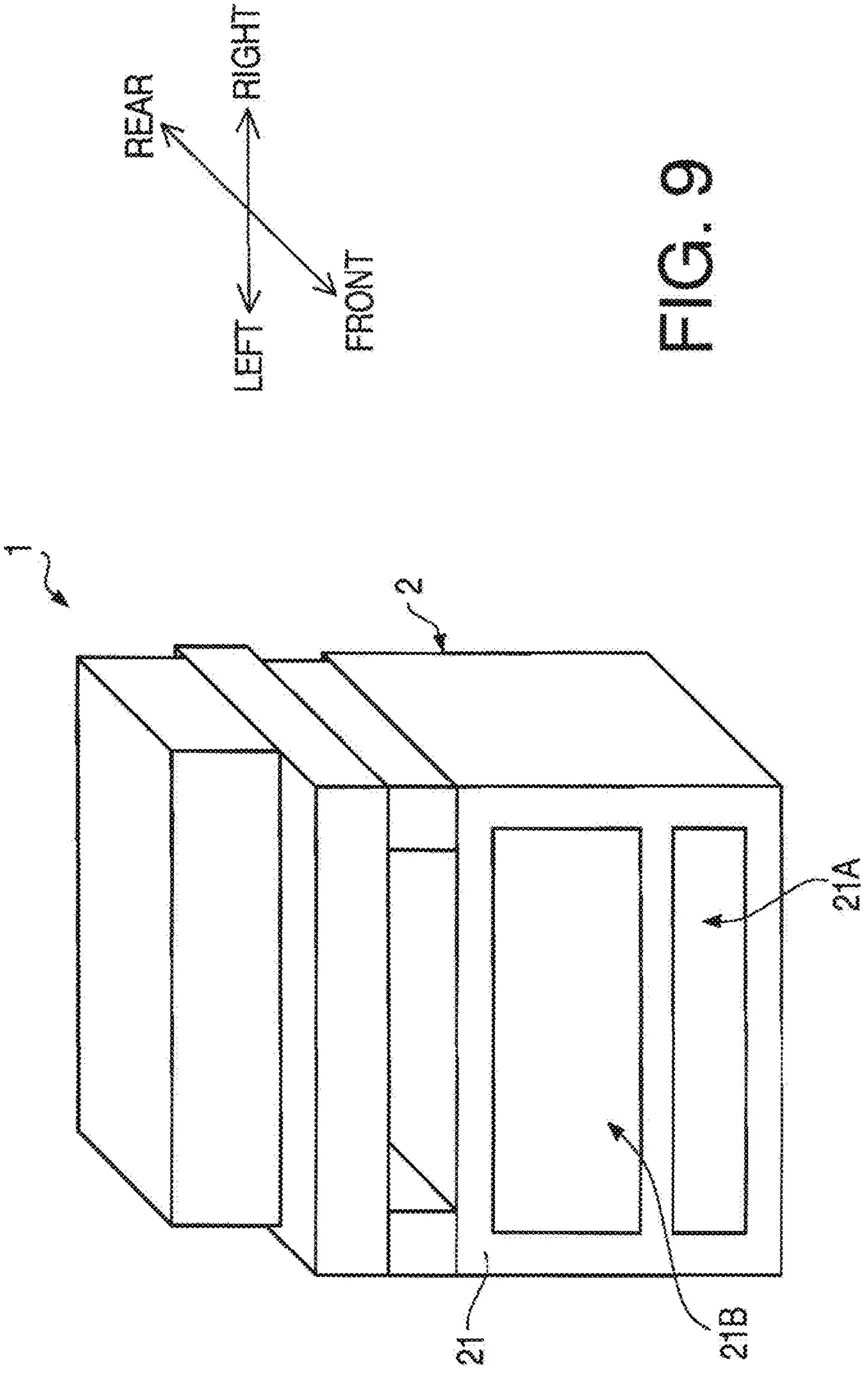
FIG. 9 is a diagram to illustrate two separately-formed openings for the waste toner container and for the drawer in a front side of the MFP according to an embodiment of the present invention.

For example, although in the above embodiment, the single opening 21A to allow the installation and removal of both the drawer 80 and the waste toner container 200 is formed. However, an opening 21A for the drawer 80 and a different opening 21B (see FIG. 9) for the waste toner container 200 may be separately formed, and covers (not shown) to respectively cover/uncover the two openings 21A, 21B may be provided.

For another example, the side, in which the opening 21A and the external-sheet inlet 421 are formed, may not necessarily be the front side, but may be the right or the left side. Further, the photosensitive drums 71A may be replaced with, for example, photosensitive belts Further, the primary-transfer rollers 92 may be replaced with, for example, conductive brushes or conductive blade springs, as long as the primary-transfer members are capable of bearing the applied transfer bias.

The structures of the cleaner device 100 and the connector 300 may not be limited to those described above. For example, a cleaner device 100 without the collecting roller 120 may be used. Alternatively or additionally, a connector 300 without the spring auger 320 may be employed. Furthermore, a connector 300 may be provided with a cover being slidable along a plane, in which the opening is formed.

The second separator roller 431 and the driven rollers 441 may not necessarily be arranged on the waste toner container 200. For example, only the driven rollers 441 may be arranged on the waste toner container 200, and the second separator roller 431 may be arranged separately from the waste toner container 200. For another example, the driving rollers 442 may be arranged on the waste toner container 200 in place of the driven rollers 441.

Further, the separator pad 432 may be replaced with, for example, a pinch roller, which is rotatably urged against the second separator roller 431. Furthermore, the second feeding path 420 may not necessarily be arranged in the lower position with respect to the waste toner container 200 but may be arranged, for example, in an upper position with respect to the waste toner container 200 (in a range between the waste toner container 200 and the intermediate transfer belt 91).

The driving force to drive the second separator roller 431 may not necessarily be input via the gear 431D. For example, the second separator roller 431 may have a passive coupling, which can be coupled with a driving coupling attached to the inner lateral surface of the chassis 2, in place of the gear 431D. The driving coupling can be inserted through an opening formed in the waste toner container 200 to couple with the passive coupling.

Further, for example, the auger 130 with the spiral may be replaced with a spring auger. For another example, the waste toner container 200 may not necessarily be installed and removed in the horizontal direction, but may be installed and removed in an angled direction with respect to the horizontal direction.

The embodiment described above may not necessarily be applied to a multicolor MFP, but may be employed in, for example, a printer and a copier. Further, the sheet may not necessarily be paper but may be, for example, an OHP sheet.

What is claimed is:

1. An image forming apparatus configured to form an image on a sheet, comprising:

- a photosensitive drum extending in a first direction, the photosensitive drum being configured to carry a toner image on a surface of the photosensitive drum;
- a belt unit comprising:
  - a first roller located on one side in a second direction and a second roller located on the other side in the second direction, the second direction being perpendicular to the first direction;
  - an intermediate transfer belt being an endless belt extended to roll around the first roller and the second roller; and
  - a primary-transfer member configured to transfer the toner image formed on the photosensitive drum to the intermediate transfer belt;
- a secondary-transfer member configured to transfer the toner image from the intermediate transfer belt to the sheet;
- a cleaner device comprising a case, in which toner collected from a surface of the intermediate transfer belt is collected, the case being arranged at a position between the photosensitive drum and the secondary-transfer member;
- a waste toner container configured to store the toner collected by the cleaner device; and
- a connector comprising a shell and connecting the cleaner device with the waste toner container,
- wherein at least a part of the connector is exposed outside the intermediate transfer belt in the first direction, and
- wherein the connector is configured to feed the toner collected by the cleaner device to the waste toner container in a direction from the other side toward the one side along the second direction.

2. The image forming apparatus according to claim 1, wherein the cleaner device comprises:

- a cleaning member configured to collect the toner on the surface of the intermediate transfer belt, and
- a conveying member configured to convey the toner collected by the cleaning member to an auger.

3. The image forming apparatus according to claim 1, wherein

- the cleaner device comprises an auger comprising a shaft and a spiral fin around the shaft, the auger being configured to convey toner collected by the cleaner device in the first direction, and
- the auger is configured to convey the toner to a position outside the intermediate transfer belt in the first direction.

4. The image forming apparatus according to claim 2, wherein at least a part of the second roller and at least a part of the auger overlap in a third direction, the third direction being perpendicular to the first direction and the second direction.

5. The image forming apparatus according to claim 2, wherein

- the intermediate transfer belt is nipped between the second roller and the secondary-transfer member, and
- the intermediate transfer belt is arranged in a gap between the auger and the second roller.

6. The image forming apparatus according to claim 1, wherein

- the waste toner container is detachably attached to the image forming apparatus, and the waste toner container moves in the second direction when the waste toner container is detaching from the image forming apparatus.

7. The image forming apparatus according to claim 1, wherein a part of the connector extends in a direction composed of directional components of the second direction and a third direction, the third direction being perpendicular to the first direction and to the second direction.

8. The image forming apparatus according to claim 1, wherein a part of the connector extends obliquely downward from the other side toward the one side along the second direction.

* * * * *